Feb. 14, 1928.
E. MOWRY
SIDE DELIVERY RAKE
Filed Jan. 11, 1923
1,658,996
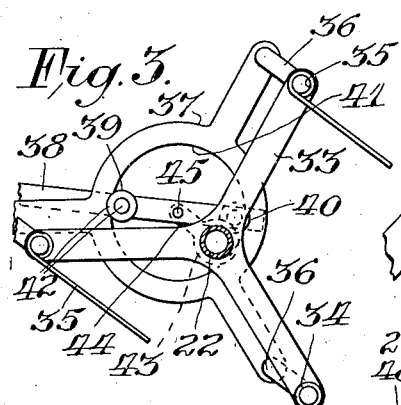
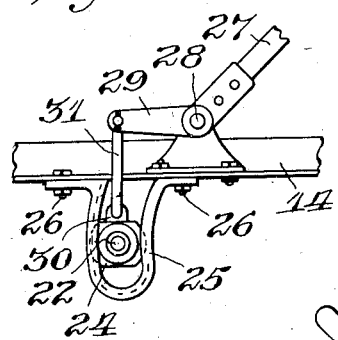
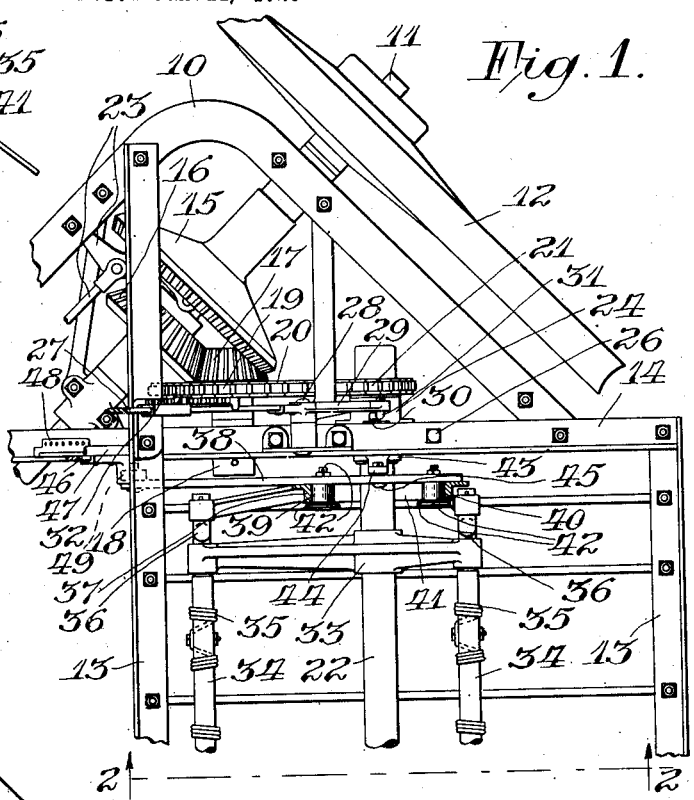
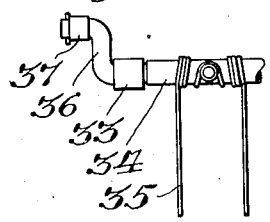
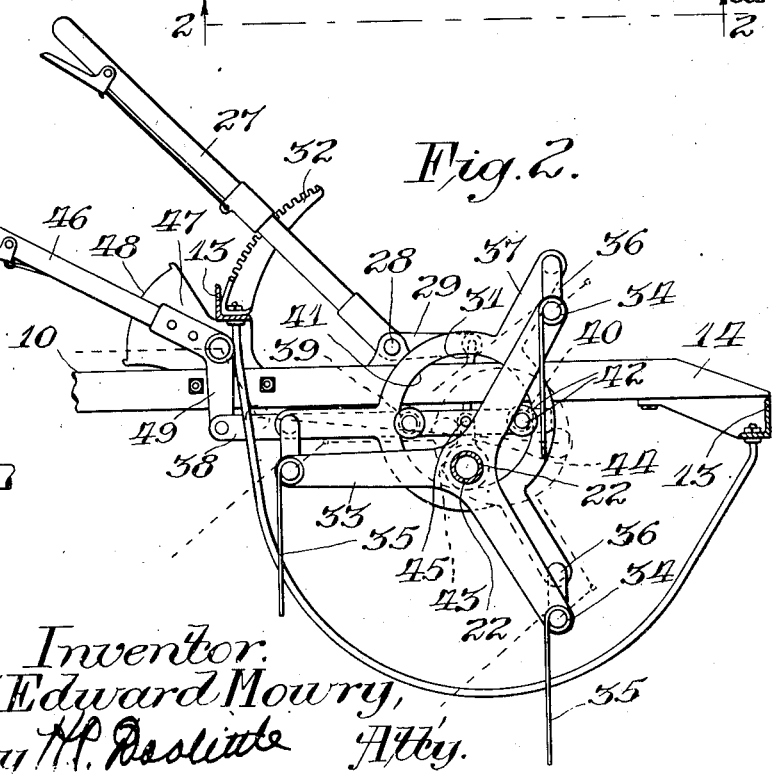
Inventor.
Edward Mowry,
By H. Doolittle  Atty.

Patented Feb. 14, 1928.

1,658,996

UNITED STATES PATENT OFFICE.

EDWARD MOWRY, OF ROCK FALLS, ILLINOIS, ASSIGNOR TO INTERNATIONAL HARVESTER COMPANY, OF CHICAGO, ILLINOIS, A CORPORATION OF NEW JERSEY.

SIDE-DELIVERY RAKE.

Application filed January 11, 1923. Serial No. 611,918.

This invention relates to side delivery rakes and tedders and more particularly to the means for controlling the angularity of the rake teeth and for vertically adjusting the raking mechanism with respect to the ground.

One of the objects of the present invention is to improve and simplify the construction of the rake teeth controlling mechanism.

Another object is to provide a construction for controlling the angularity of the teeth whereby the raking mechanism may be vertically adjusted without affecting to any considerable degree the angularity of the teeth. This and other objects are obtained by a construction of such means as levers or equivalent mechanism and a bar having a plurality of rollers on which a cam is mounted for controlling the angularity of the rake teeth.

One embodiment of my invention is illustrated in the accompanying drawings and in these drawings—

Fig. 1 is a fragmentary plan view of my improved controlling and adjusting mechanism;

Fig. 2 is a side elevational view taken on the lines 2—2 in Fig. 1;

Fig. 3 is a detail view showing the cam construction and the parts associated therewith;

Fig. 4 is a detail view showing the manner in which the rotary rake frame shaft is mounted in its adjustable bearing; and Fig. 5 is a detail view showing the crank construction of the rotary rake frame and also showing the manner in which the rake teeth are connected to the rake frame.

My improved rake teeth controlling and adjusting mechanism is shown embodied in the construction of a side delivery rake and tedder of the type now generally in use. This construction comprises a main frame 10, only part of which is shown, mounted on the axle 11 which in turn is supported by the carrying wheels 12, only one of which is shown. The rake proper is carried by the diagonally disposed rearwardly extending frame members 13 connected at their inner ends to the frame 10 and also secured to a diagonal brace 14 which is rigidly mounted on the main frame. Suitable driving mechanism for the combined machine is provided and in this instance consists of bevel gears 15 and 16 loosely mounted on the axle 11 and meshing with a bevel gear 17 carried by a bracket 18 secured to the brace 14. The bevel gear 17 is formed integrally with the sprocket 19 which is connected by means of a drive chain 20 to a sprocket 21 carried on and fixed to the inner end of the rake shaft 22. The bevel gears 15 and 16 are connected to the main axle 11 by any well known means, in this particular case by a clutch member (not shown) splined to the shaft 11. This clutch member is adapted to be swung into engagement with the driving gears 15 and 16 as desired by means of a shipper mechanism 23, only part of which is shown.

It should be understood that the specific mechanism above described is not necessary for the successful operation of this invention as any other suitable construction may be employed.

The inner end of the rake shaft 22 adjacent the sprocket 21 is supported in a bearing box 24 which is adjustably supported in a bracket 25 secured to the brace 14 by means of bolts 26. The rotary rake cylinder is adjusted in the bracket 25 by a hand operating lever 27 pivoted to the brace 14 at 28. The lever 27 has a crank 29 rigidly secured thereto. The free end of the crank 29 is connected by means of an ear 30 and a link 31 to the bearing box 24. By this construction, it will be readily understood that by adjusting the lever 27 to various positions on its adjusting rack 32, the raking cylinder will be adjusted with respect to the ground. The raking cylinder includes the usual spider 33 fixed to the rake shaft 22. Pivotally mounted on the outer ends of the spider arms 33 are the usual rake bars 34 having secured thereto at regular intervals rake teeth 35. The forward ends of the rake bars 34 are provided with cranks 36. The free ends of these cranks are pivotally connected to the usual cam spider 37 which controls the angularity of the teeth 35 on the rake bars 34.

The mechanism which forms the essential part of the present invention comprises the means for controlling or adjusting the angularity of the rake teeth 35. This includes a normally horizontally disposed bar 38 positioned adjacent the forward side of the cam 37. The bar 38 is provided with two oppositely disposed rollers 39 and 40. The rollers 39 and 40 are positioned within and engage the cam surface 41 and maintain the cam eccentrically with respect to the rake shaft 22. The rollers 39 and 40 are held in engagement with the cam 37 by means of washers and bolts 42. Pivotally mounted on the shaft 22 adjacent the bearing box 24 is a collar 43. The collar 43 is provided with an upwardly extending ear 44. The ear 44 is pivotally connected intermediate the rollers 39 and 40 to the bar 38 at 45. By this construction, it will be understood that the bar 38 is pivotally connected to the rake shaft 22. The angularity of the rake teeth is controlled by means of the lever 46 pivoted to the brace 14 by means of a bracket 47. The lever may be adjustably secured in various positions of adjustment by the segment rack 48 formed on the bracket 47. Rigidly related to the lever 46 is a crank 49, the free end of which is pivotally connected to the bar 38 for adjusting the cam 37 and thereby controlling the angularity of the rake teeth.

From the above description and illustrations, it will be seen that a simple and efficient construction for controlling and adjusting the cam, and thereby the angle of the teeth, has been provided and other advantages resulting from the simplicity of construction will be obvious.

While I have in the above specification described one embodiment of my invention, it will be understood that the invention is capable of modification and that modification may be used without departing from the spirit and scope of the invention as expressed in the following claims.

What I claim is:

1. In a combined side delivery rake and tedder, a supporting and driving wheel, a rotary frame, a rake shaft, rake teeth carried by said frame, a spider eccentrically adjustable relative to said shaft for controlling the movement of said rake teeth as said frame is rotated, and a substantially horizontally movable bar provided with rollers engaging the spider for controlling the angularity of said rake teeth.

2. In a combined side delivery rake and tedder, a supporting wheel, a shaft carrying a rotary frame, driving means for the frame, rake teeth carried on the frame, a cam rotated by connections with the frame for controlling the movement of said rake teeth as said frame is rotated, and means including a horizontally disposed bar linked intermediately of its ends to the shaft for engaging and supporting said cam and controlling the angularity of said rake teeth upon movement of the bar.

3. In a combined side delivery rake and tedder, a supporting wheel, a rake shaft, a rotary frame mounted on said rake shaft, driving connections for rotating said rake shaft and frame from said supporting wheel, rake teeth carried by the rotary frame, a cam positioned eccentrically with respect to said rake shaft, a collar mounted on said rake shaft adjacent said cam, and means positioned diametrically across said cam and pivoted to said collar for supporting the cam and controlling the angularity of said rake teeth.

4. In a combined side delivery rake and tedder, a supporting wheel, a rake shaft, a rotary frame mounted on said rake shaft, driving connections between said supporting wheel and said rake shaft for rotating said shaft and said frame, rake teeth carried by the rotary frame, a cam positioned eccentrically with respect to said rake shaft, a collar mounted on said rake shaft and positioned adjacent said cam, and a bar having a plurality of rollers thereon engageable with said cam for supporting the same and pivotally connected to said collar for controlling the angularity of said rake teeth.

In testimony whereof I affix my signature.

EDWARD MOWRY.